United States Patent Office 3,763,285
Patented Oct. 2, 1973

3,763,285
1-PHENYL-2-CYANOVINYL(THIO)-PHOSPHORIC OR -PHOSPHONIC ACID ESTERS
Hans-Jochem Riebel, Wuppertal-Elberfeld, Ingeborg Hammann, Cologne, Günter Unterstenhöfer, Opladen, Wolfgang Behrenz, Cologne, and Wilhelm Stendel, Wuppertal-Elberfeld, Germany, assignors to Bayer Aktiengesellschaft, Leverkusen, Germany
No Drawing. Filed June 7, 1971, Ser. No. 150,847
Claims priority, application Germany, June 20, 1970, P 20 30 509.3
Int. Cl. A01n 9/36; C07f 9/16
U.S. Cl. 260—940    9 Claims

ABSTRACT OF THE DISCLOSURE 1-phenyl-2-cyanovinyl(thio)-phosphoric or -phosphonic acid esters of the general formula

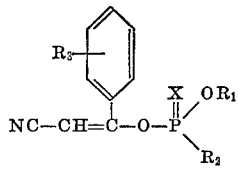

(I)

in which

X is oxygen or sulfur,
$R_1$ is lower alkyl,
$R_2$ is lower alkyl or alkoxy, phenyl or lower monoalkylamino, and
$R_3$ is hydrogen, halogen, lower alkyl, alkoxy or alkylmercapto, which possess insecticidal, acaricidal, ectoparasiticidal, fungicidal, bactericidal and rodenticidal properties.

---

The present invention relates to and has for its objects the provision of particular new 1-phenyl-2-cyanovinyl-(thio)-phosphoric or -phosphonic acid esters i.e. lower alkyl esters of 1-(optionally halogen-, lower alkyl-, alkoxy- or alkylmercapto-)phenyl-2-cyanovinyl(thio)-phosphoric or alkanephosphonic acids or monoalkylamides, which possess insecticidal, acaricidal, ectoparasiticidal, fungicidal, bactericidal and rodenticidal properties, active compositions in the form of mixtures of such compounds with solid and liquid dispersible carrier vehicles, and methods for producing such compounds and for using such compounds in a new way especially for combating pests, e.g. insects, acarids, ectoparasites, fungi, bacteria and rodents, especially insects and acarids, with other and further objects becoming apparent from a study of the within specification and accompanying examples.

It is known that 2-chloro-1-(2,4,5-trichlorophenyl)-vinyldimethyl-phosphate (Compound A, cf. U.S. patent specification 3,102,842), 2-chloro-1-(2,4-dichlorophenyl)-vinyldiethyl-phosphate (Compound B, cf. U.S. patent specification 3,003,916) and 2-cyano-2-phenyl-1-methyl-diethylthiophosphate (Compound C, cf. Y. Nishizawa, Bull. Agr. Chem. Soc. Japan, 25, 61 [1961] and published Japanese patent application 2,926 [1960]) exhibit insecticidal properties.

The present invention provides the new 1-phenyl-2-cyanovinyl(thio)-phosphoric or -phosphonic acid derivatives of the general formula

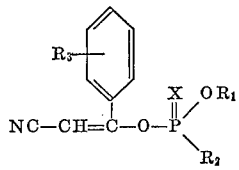

(I)

in which

X is oxygen or sulfur,
$R_1$ is lower alkyl,
$R_2$ is lower alkyl or alkoxy, phenyl or lower monoalkylamino, and
$R_3$ is hydrogen, halogen, lower alkyl, alkoxy or alkylmercapto.

These compounds exhibit strong insecticidal and acaricidal properties.

It will be understood that the general Formula I includes the corresponding cis and trans isomers of the constitutions (II) and (III)

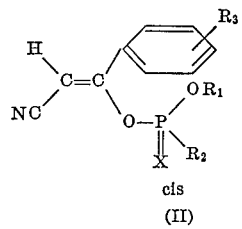

cis    trans
(II)    (III)

as well as mixtures thereof.

$R_1$ is preferably alkyl with 1 to 4 and especially 1 to 3 carbon atoms. $R_2$ is preferably alkyl or alkoxy with 1 to 4 and especially 1 to 3 carbon atoms, or phenyl, or monoalkylamino with 1 to 4 and especially 1 to 3 carbon atoms. $R_3$ is preferably hydrogen, chlorine, bromine, alkyl, alkoxy, or alkylmercapto groups with, in each case, 1 to 4 carbon atoms.

The present invention also provides a process for the production of a 2-cyanovinyl-(thio)-phosphoric or -phosphonic acid derivative of the Formula I in which
  (a)

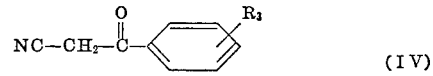

(IV)

in which $R_3$ has the meaning stated above, is reacted, optionally in the form of an alkali metal salt or in the presence of an acid-binding agent and optionally in the presence of a solvent, with a phosphoryl-(phosphonyl)-halide of the general formula

(V)

in which

X, $R_1$ and $R_2$ have the above meanings, and
Hal is halogen;

or (b) A benzoic acid ester of the general formula

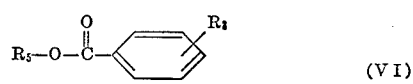

(VI)

in which $R_3$ has the meaning stated above, and
$R_5$ is alkyl with 1 to 6 carbon atoms, preferably lower alkyl and especially alkyl with 1 to 4 carbon atoms, is condensed with acetonitrile in the presence of a base and, after completion of the reaction, there is added to the reaction mixture (preferably without isolation of the intermediate product) a phosphoryl-(phosphonyl)-halide of the Formula V, optionally in the presence of a solvent; or (c) In the case in which $R_1$ is alkyl and $R_2$ is alkoxy, a benzoylchloroacetonitrile of the general formula

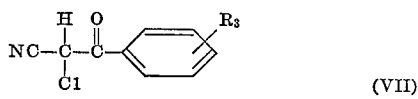

(VII)

in which $R_3$ has the meaning stated above, is reacted with a trialkylphosphite of the general formula $$P(OR_4)_3 \quad (VIII)$$

in which $R_4$ is lower alkyl, optionally in the presence of a solvent.

Surprisingly, the 2-cyanovinyl-(thio)-phosphoric or -phosphonic acid derivatives according to the invention show a remarkably better insecticidal and acaricidal activity than the known 2-chloro-1(2,4,5-trichlorophenyl)-vinyldimethyl- or 2-chloro-1-(2,4-dichlorophenyl)-vinyl-diethyl-phosphate and 2-cyano-2-phenyl-1-methyldiethyl-thiophosphate of analogous constitution and the same type of activity. The substances according to the invention therefore represent a valuable enrichment of the art.

If benzoylacetonitrile or its sodium salt and thiophosphoric acid O,O-diethyl ester chloride are used according to the first process variant as starting materials, the reaction course can be represented by the following formula scheme:

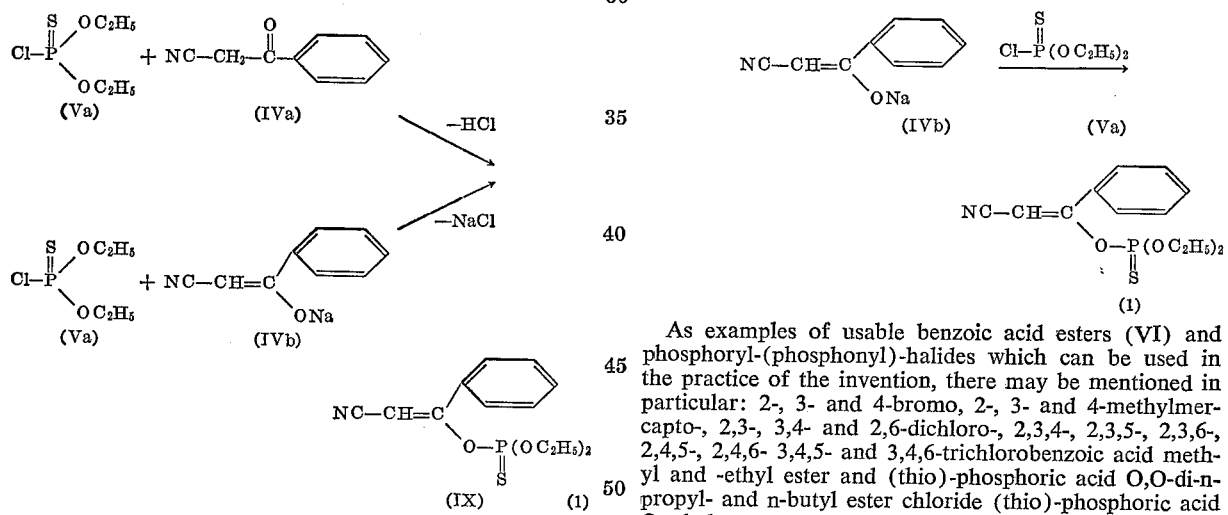

As examples of benzoylacetonitriles or their alkali metal salts and phosphoryl-(phosphonyl)-halides which may be used in the practice of the invention, there may be mentioned in particular: 2-, 3- and 4-bromo-, 2-, 3- and 4-methylmercapto-, 2,3-, 2,6-, 3,4-dichloro, 2,3,4-, 2,3,5-, 2,3,6-, 2,4,5-, 2,4,6-, 3,4,5- and 3,4,6-trichloro-benzoyl-acetonitrile as well as (thio)-phosphoric acid O,O-di-n-propyl- and -n-butyl ester chloride, (thio)-phosphoric acid O-ethyl ester mono-N-ethyl-, -n-propyl- and -i-propyl-amide chloride.

The benzoylacetonitriles (IV) are partially described in the literature and the phosphoryl-(phosphonyl)-halides (V) are known. They can be prepared according to customary methods.

If the reaction is carried out in the presence of a solvent, water or practically any inert organic solvent or diluent may be used. These include preferably aliphatic and aromatic possibly chlorinated hydrocarbons, such as benzene, toluene, xylene, benzine, methylene chloride, chloroform, carbon tetrachloride, chlorobenzene; ethers, such as diethyl ether, dibutyl ether, dioxane; ketones such as acetone, methylethyl ketone, methylisopropyl ketone and methylisobutyl ketone; and nitriles, such as acetonitrile.

If an acid acceptor is used, it may be any of the usual acid-binding agents. Particularly suitable are alkali metal carbonates and alcoholates such as sodium or potassium carbonate, methylate or ethylate; aliphatic, aromatic or heterocyclic amines, such as triethylamine or pyridine, amine, dimethylaniline, dimethylbenzylamine or pyridine. Preferably, about one molar equivalent of potassium or sodium carbonate is used relative to the reactants.

The reaction temperatures can be varied within a fairly wide range. In general, the reaction is carried out at about $-10$ to $+100$, preferably at about 20 to 60° C.

The reactions are, in general, carried out at normal pressure.

When carrying out the process, one mole of alkali metal salt of the benzoylacetonitrile concerned or one mole of the latter in the presence of about one mole of acid-binding agent is preferably used per mole of phosphoryl-(phosphonyl)-halide.

If benzoic acid ethyl ester, acetonitrile and thiophosphoric acid O,O-diethyl ester chloride are used according to process variant (b) as starting materials, the reaction proceeds in the following sense:

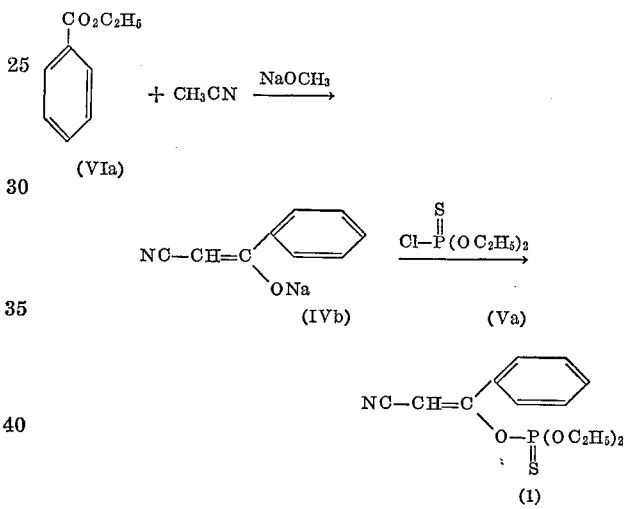

As examples of usable benzoic acid esters (VI) and phosphoryl-(phosphonyl)-halides which can be used in the practice of the invention, there may be mentioned in particular: 2-, 3- and 4-bromo, 2-, 3- and 4-methylmercapto-, 2,3-, 3,4- and 2,6-dichloro-, 2,3,4-, 2,3,5-, 2,3,6-, 2,4,5-, 2,4,6- 3,4,5- and 3,4,6-trichlorobenzoic acid methyl and -ethyl ester and (thio)-phosphoric acid O,O-di-n-propyl- and n-butyl ester chloride (thio)-phosphoric acid O-ethyl ester mono-N-ethyl, -n-propyl- and -iso-propyl-amide chloride.

The benzoic acid esters and phosphoryl-(phosphonyl)-halides to be used as starting compounds are known from the literature and can be prepared according to known processes.

The former are condensed with acetonitrile in the presence of a base, preferably an alkali metal alcoholate, to give the salts of the appropriate benzoylacetonitriles and the latter are then, preferably without intermediate isolation, reacted with the phosphoryl-(phosphonyl)-halides, optionally in inert solvents.

As such, practically all inert organic solvents or diluents are suitable, for example, any of the classes and particular solvents mentioned above in connection with process variant (a).

The reaction temperatures may, in the case of the phosphorylation, vary within a wide range. In general, the reaction is carried out at from about 10 to 100, preferably about 20 to 60° C.

The reaction is, in general, carried out under normal pressure.

When carrying out the process, there are generally used, per mole of benzoic acid ester, 1.25 moles of acetonitrile in the presence of 1 mole of base, preferably sodium alcoholate. After the condensation has ended, the alcohol formed during the reaction is generally distilled off. Then the mixture is, in most cases, diluted with acetonitrile or acetone, and the phosphorylation is carried out most preferably at a temperature of about 40 to 60° C.

If benzoylchloroacetonitrile and trimethylphosphite are used according to process variant (c) as starting materials, the reaction course is illustrated by the following equation:

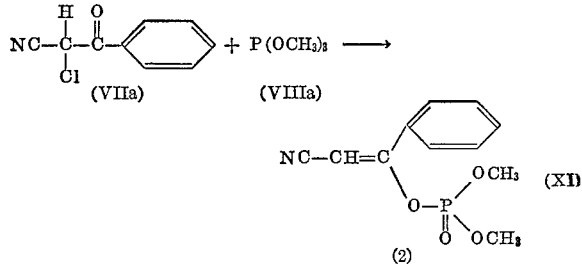

As examples of benzoylchloroacetonitrile (VII) and trialkylphosphites (VIII) which can be used according to this process variant, there may be mentioned in particular: 2-methyl-, 2-, 3- and 4-bromo, 2-, 3- and 4-methylmercapto-, 2-chloro-4-ethylmercapto-, 2,3-, 2,4-, 2,5-, 2,6- and 3,4-dichlorobenzoylchloroacetonitrile and trimethyl-, triethyl- and tri-n-propylphosphite.

The benzoylchloroacetonitriles (VII), some of which do not appear to be known, can be prepared according to known method from the appropriate benzoylacetonitriles.

When carrying out the reaction of process variant (c) it is possibe to work without the use of solvents although inert organic solvents or diluents can be used if desired. These include preferably all aliphatic and aromatic possibly chlorinated hydrocarbons, such as benzene, xylene, benzine, chlorobenzene, toluene; and ethers, such as diethyl ether and dibutyl ether.

The reaction temperatures can be varied within a fairly wide range. In general, the reaction is carried out at from about 20 to 150, preferaby at about 50 to 100° C.

The reaction is, in general, carried out at normal pressure.

When carrying out this process variant, preferably 1 mole of benzoylchloroacetonitrile is reacted with 1 to 2 moles of trialkylphosphite.

The working up of the reaction mixture in the three process variants described may be effected according to customary methods.

The substances according to the invention are in most cases obtained in the form of colorless to red-colored, viscous, water-insoluble oils which can be distilled without decomposition. They can also be freed from the last volatile components by so-called "slight distillation," i.e. prolonged heating at moderately elevated temperatures under reduced pressure, and in this way be purified. The refractive index as well as the elementary analysis is particularly useful in helping to characterize the compounds.

As already mentioned, the compounds according to the invention are distinguished by an outstanding acaricidal and insecticidal effectiveness against plants pests, hygiene pests and pests of stored products, as well as ectoparasites. They possess a good activity both against sucking and biting insects and mites. They also exhibit a fungicidal and bactericidal effectiveness. Moreover, some of the compounds according to the invention may be used as rodenticides.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the current gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and tobacco cutworm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects contemplated herein are beetles (Coleoptera), for example the granary weevil (*Sitophilus granarius=Calandra granaria*), the Colorado beetle (*Liptinotarsa decemlineata*), the dock beetle (*Gastrophysa viridula*), the mustard beetle (*Phaedon cochleariae*), the blossom beetle (*Meligethes aeneus*) the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*); cockroaches, such as the German cockroach (*Glattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera comprise essentially the flies, such as the vinegar fly (*Drosophila melanogaster*), the Mediterranean fruit fly (*Ceratitis capitata*), the house fly (*Musca domestica*), the little house fly *Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius=Tetranychus althaeae* or *Tetranychus urticae*) and the European red mite (*Paratetranychus pilosus=Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally ticks such as the relapsing fever tick (*Ornithodorus moubata*); and the like.

When applied against hygiene pests and pests of stored products, particularly flies and mosquitoes, the process products are also distinguished by an outstanding residual activity on wood and clay as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides, fungicides, bactericides and nematocides, or rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1% by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids, ectoparasites, fungi, bacteria and rodents and more particularly methods of combating at least one of insects, and acarids which comprises applying to at least one of correspondingly (a) such insects, (b) such acarids, (c) such ectoparasites, (d) such fungi, (e) such bacteria, (f) such rodents, and (g) the corresponding habitat thereof, i.e. the locus to be protected, a correspondingly combative or toxic amount, i.e. an insecticidally, acaricidally, ectoparasiticidally, fungicidally, bactericidally or rodenticidally effective amount of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

Myzus test (contact action)

Solvent: 3 parts by weight acetone.
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 1.

TABLE 1
Myzus test

| Active compound | Concentration of active compound in percent | Degree of destruction in percent after 1 day |
|---|---|---|
| (C) $(C_2H_5O)_2\overset{S}{\underset{\|}{P}}-O-\underset{\underset{CH_3}{\|}}{\overset{\overset{CN}{\|}}{C}}-C_6H_5$ (known) | 0.1<br>0.01 | 98<br>20 |
| (B) $(C_2H_5O)_2\overset{O}{\underset{\|}{P}}-O-C=CH$, 2,4-Cl$_2$-C$_6$H$_3$, Cl (known) | 0.1<br>0.01 | 100<br>40 |
| (A) $(CH_3O)_2\overset{O}{\underset{\|}{P}}-O-C=CH-Cl$, 2,4,5-Cl$_3$-C$_6$H$_2$ (known) | 0.1 | 0 |
| (3) $(CH_3O)_2\overset{S}{\underset{\|}{P}}-O-C=CH-CN$, C$_6$H$_5$ | 0.1<br>0.01<br>0.001 | 100<br>100<br>55 |
| (4) $(C_2H_5O)_2\overset{O}{\underset{\|}{P}}-O-C=CH-CN$, C$_6$H$_5$ | 0.1<br>0.01 | 100<br>100 |
| (1) $(C_2H_5O)_2\overset{S}{\underset{\|}{P}}-O-C=CH$, C$_6$H$_5$, CN | 0.1<br>0.01<br>0.001 | 100<br>100<br>98 |
| (5) $C_2H_5O-\overset{S}{\underset{C_6H_5}{P}}-O-C=CH$, C$_6$H$_5$, CN | 0.1<br>0.01 | 100<br>100 |
| (6) $C_2H_5O-\overset{S}{\underset{C_2H_5}{P}}-O-C=CH$, C$_6$H$_5$, CN | 0.1<br>0.01<br>0.001 | 100<br>100<br>85 |
| (7) $CH_3O-\overset{S}{\underset{C_2H_5}{P}}-O-C=CHCN$, C$_6$H$_5$ | 0.1<br>0.01<br>0.001 | 100<br>100<br>65 |
| (8) $C_2H_5O-\overset{S}{\underset{CH_3-NH}{P}}-O-C=CH$, C$_6$H$_5$, CN | 0.1<br>0.01 | 100<br>100 |
| (9) $(C_2H_5O)_2\overset{O}{\underset{\|}{P}}-O-C=CH$, 2-Cl-C$_6$H$_4$, CN | 0.1<br>0.01<br>0.001 | 100<br>99<br>95 |
| (10) $(C_2H_5O)_2\overset{S}{\underset{\|}{P}}-O-C=CH$, 2-Cl-C$_6$H$_4$, CN | 0.1<br>0.01<br>0.001 | 100<br>100<br>99 |
| (11) $C_2H_5O-\overset{S}{\underset{C_2H_5}{P}}-O-C=CH$, 2-Cl-C$_6$H$_4$, CN | 0.1<br>0.01<br>0.001 | 100<br>100<br>98 |
| (12) $(C_2H_5O)_2\overset{O}{\underset{\|}{P}}-O-C=CH$, 3-Cl-C$_6$H$_4$, CN | 0.1<br>0.01 | 100<br>100 |
| (13) $(C_2H_5O)_2\overset{S}{\underset{\|}{P}}-O-C=CH$, 3-Cl-C$_6$H$_4$, CN | 0.1<br>0.01<br>0.001 | 100<br>100<br>50 |
| (14) $C_2H_5O-\overset{S}{\underset{C_2H_5}{P}}-O-C=CH$, 3-Cl-C$_6$H$_4$, CN | 0.1<br>0.01<br>0.001 | 100<br>100<br>70 |
| (15) $(C_2H_5O)_2\overset{O}{\underset{\|}{P}}-O-C=CH$, 4-Cl-C$_6$H$_4$, CN | 0.1<br>0.01 | 100<br>100 |
| (16) $(C_2H_5O)_2\overset{S}{\underset{\|}{P}}-O-C=CH$, 4-Cl-C$_6$H$_4$, CN | 0.1<br>0.01<br>0.001<br>0.0001 | 100<br>100<br>100<br>60 |

TABLE 1—Continued

| Active compound | Concentration of active compound in p.p.m. | Degree of destruction in percent after 1 day |
|---|---|---|
| (17) $C_2H_5O$—P(=S)($C_2H_5$)—O—C(=CH)—(4-Cl-C$_6$H$_4$)(CN) | 0.1<br>0.01<br>0.001 | 100<br>99<br>75 |
| (18) $(C_2H_5O)_2$P(=S)—O—C(=CH)—(2,4-Cl$_2$-C$_6$H$_3$)(CN) | 0.1<br>0.01<br>0.001<br>0.0001 | 100<br>100<br>100<br>90 |
| (19) $C_2H_5O$—P(=S)($C_2H_5$)—O—C(=CH)—(2,4-Cl$_2$-C$_6$H$_3$)(CN) | 0.1<br>0.01<br>0.001 | 100<br>100<br>85 |
| (20) $(C_2H_5O)_2$P(=S)—O—C(=CH)—(2,5-Cl$_2$-C$_6$H$_3$)(CN) | 0.1<br>0.01<br>0.001<br>0.0001 | 100<br>99<br>95<br>50 |
| (21) $C_2H_5O$—P(=S)($C_2H_5$)—O—C(=CH)—(2,6-Cl$_2$-C$_6$H$_3$)(CN) | 0.1<br>0.01<br>0.001 | 100<br>100<br>50 |
| (22) $(C_2H_5O)_2$P(=S)—O—C(=CH)—(2-Br-C$_6$H$_4$)(CN) | 0.1<br>0.01<br>0.001<br>0.0001 | 100<br>95<br>95<br>70 |
| (23) $C_2H_5O$—P(=S)($C_2H_5$)—O—C(=CH)—(2-Br-4-Cl-C$_6$H$_3$)(CN) | 0.1<br>0.01<br>0.001 | 100<br>100<br>100 |
| (24) $(C_2H_5O)_2$P(=S)—O—C(=CH)—(2-CH$_3$-C$_6$H$_4$)(CN) | 0.1<br>0.01<br>0.001 | 100<br>100<br>95 |
| (25) $C_2H_5O$—P(=S)($C_2H_5$)—O—C(=CH)—(2-CH$_3$-C$_6$H$_4$)(CN) | 0.1<br>0.01<br>0.001 | 100<br>100<br>98 |
| (26) $(C_2H_5O)_2$P(=O)—O—C(=CH)—(2-CH$_3$-C$_6$H$_4$)(CN) | 0.1<br>0.01<br>0.001 | 100<br>100 |
| (27) $(C_2H_5O)_2$P(=S)—O—C(=CH)—(3-CH$_3$-C$_6$H$_4$)(CN) | 0.1<br>0.01<br>0.001<br>0.0001 | 100<br>100<br>90<br>60 |
| (28) $C_2H_5O$—P(=S)($C_2H_5$)—O—C(=CH)—(3-CH$_3$-C$_6$H$_4$)(CN) | 0.1<br>0.01<br>0.001 | 100<br>100<br>99 |
| (29) $(C_2H_5O)_2$P(=O)—O—C(=CH)—(4-CH$_3$-C$_6$H$_4$)(CN) | 0.1<br>0.01 | 100<br>90 |
| (30) $(C_2H_5O)_2$P(=S)—O—C(=CH)—(4-CH$_3$-C$_6$H$_4$)(CN) | 0.1<br>0.01<br>0.001 | 100<br>100<br>70 |
| (31) $C_2H_5O$—P(=S)($C_2H_5$)—O—C(=CH)—(4-CH$_3$-C$_6$H$_4$)(CN) | 0.1<br>0.01 | 100<br>99 |
| (32) $(C_2H_5O)_2$P(=O)—O—C(=CH)—(2-CH$_3$O-C$_6$H$_4$)(CN) | 0.1<br>0.01<br>0.001 | 100<br>100<br>70 |
| (33) $C_2H_5O$—P(=S)($C_2H_5$)—O—C(=CH)—(2-CH$_3$O-C$_6$H$_4$)(CN) | 0.1<br>0.01<br>0.001 | 100<br>100<br>100 |
| (34) $(C_2H_5O)_2$P(=S)—O—C(=CH)—(3-CH$_3$O-C$_6$H$_4$)(CN) | 0.1<br>0.01<br>0.001 | 100<br>99<br>55 |

TABLE 1—Continued

| Active compound | Concentration of active compound in p.p.m. | Degree of destruction in percent after 1 day |
|---|---|---|
| (35) 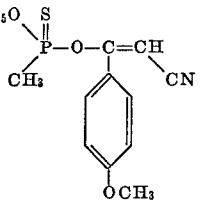 | 0.1 / 0.01 | 100 / 95 |

EXAMPLE 2

Phaedon larvae test

Solvent: 3 parts by weight acetone.
Emulsifier: 1 part by weight alkylaryl polyglycol ether.

To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100% means that all the beetle larvae are killed. 0% means that none of the beetle larvae are killed.

The active compounds, the concentration of the active compound, the times of evaluation and the results can be seen from the following Table 2.

TABLE 2
Phaedon larvae test

| Active compound | Concentration of active compound in percent | Degree of destruction in percent after 3 days |
|---|---|---|
| (C) (C₂H₅O)₂P(S)—O—C(CN)=C(CH₃)—C₆H₅ (known) | 0.1 / 0.01 | 100 / 0 |
| (B) (C₂H₅O)₂P(O)—O—C(Cl)=CH—(2,4-Cl₂C₆H₃) (known) | 0.1 / 0.01 | 100 / 70 |
| (1) (C₂H₅O)₂P(S)—O—C(C₆H₅)=CH—CN | 0.1 / 0.01 / 0.001 | 100 / 100 / 95 |
| (6) C₂H₅O(C₂H₅)P(S)—O—C(C₆H₅)=CH—CN | 0.1 / 0.01 / 0.001 | 100 / 100 / 69 |
| (36) (CH₃CH₂CH₂O)₂P(S)—O—C(C₆H₅)=CH—CN | 0.1 / 0.01 | 100 / 95 |
| (37) ((CH₃)₂HCO)₂P(S)—O—C(C₆H₅)=CH—CN | 0.1 / 0.01 | 100 / 90 |
| (10) (C₂H₅O)₂P(S)—O—C(2-Cl-C₆H₄)=CH—CN | 0.1 / 0.01 / 0.001 | 100 / 100 / 90 |
| (11) C₂H₅O(C₂H₅)P(S)—O—C(2-Cl-C₆H₄)=CH—CN | 0.1 / 0.01 / 0.001 | 100 / 100 / 60 |
| (16) (C₂H₅O)₂P(S)—O—C(4-Cl-C₆H₄)=CH—CN | 0.1 / 0.01 / 0.001 | 100 / 100 / 95 |
| (17) C₂H₅O(C₂H₅)P(S)—O—C(4-Cl-C₆H₄)=CH—CN | 0.1 / 0.01 / 0.001 | 100 / 100 / 90 |
| (18) (C₂H₅O)₂P(S)—O—C(2,4-Cl₂C₆H₃)=CH—CN | 0.1 / 0.01 / 0.001 | 100 / 100 / 95 |
| (19) C₂H₅O(C₂H₅)P(S)—O—C(2,4-Cl₂C₆H₃)=CH—CN | 0.1 / 0.01 / 0.001 | 100 / 100 / 100 |

TABLE 2—Continued

| | Active compound | Concentration of active compound in percent | Degree of destruction in percent after 3 days |
|---|---|---|---|
| (20) | $(C_2H_5O)_2\overset{S}{\underset{\parallel}{P}}-O-C(CN)=CH-C_6H_3(Cl)(Cl)$ (2,4-dichlorophenyl) | 0.1 / 0.01 / 0.001 | 100 / 100 / 100 |
| (21) | $C_2H_5O(C_2H_5)\overset{S}{\underset{\parallel}{P}}-O-C(CN)=CH-C_6H_3(Cl)(Cl)$ | 0.1 / 0.01 / 0.001 | 100 / 100 / 90 |
| (22) | $(C_2H_5O)_2\overset{S}{\underset{\parallel}{P}}-O-C(CN)=CH-C_6H_4(Br)$ | 0.1 / 0.01 / 0.001 / 0.0001 | 100 / 100 / 100 / 50 |
| (23) | $C_2H_5O(C_2H_5)\overset{S}{\underset{\parallel}{P}}-O-C(CN)=CH-C_6H_4(Br)$ | 0.1 / 0.01 / 0.001 | 100 / 100 / 60 |
| (24) | $(C_2H_5O)_2\overset{S}{\underset{\parallel}{P}}-O-C(CN)=CH-C_6H_4(CH_3)$ | 0.1 / 0.01 / 0.001 | 100 / 100 / 100 |
| (25) | $C_2H_5O(C_2H_5)\overset{S}{\underset{\parallel}{P}}-O-C(CN)=CH-C_6H_4(CH_3)$ | 0.1 / 0.01 / 0.001 | 100 / 100 / 100 |
| (27) | $(C_2H_5O)_2\overset{S}{\underset{\parallel}{P}}-O-C(CN)=CH-C_6H_4(CH_3)$ (para) | 0.1 / 0.01 / 0.001 | 100 / 100 / 90 |
| (28) | $C_2H_5O(C_2H_5)\overset{S}{\underset{\parallel}{P}}-O-C(CN)=CH-C_6H_4(CH_3)$ | 0.1 / 0.01 / 0.001 | 100 / 100 / 100 |
| (30) | $(C_2H_5O)_2\overset{S}{\underset{\parallel}{P}}-O-C(CN)=CH-C_6H_4(CH_3)$ | 0.1 / 0.01 / 0.001 | 100 / 100 / 90 |
| (32) | $(C_2H_5O)_2\overset{O}{\underset{\parallel}{P}}-O-C(CN)=CH-C_6H_4(OCH_3)$ | 0.1 / 0.01 | 100 / 100 |
| (33) | $C_2H_5O(C_2H_5)\overset{S}{\underset{\parallel}{P}}-O-C(CN)=CH-C_6H_4(OCH_3)$ | 0.1 / 0.01 / 0.001 | 100 / 100 / 90 |
| (38) | $C_2H_5O(C_2H_5)\overset{S}{\underset{\parallel}{P}}-O-C(CN)=CH-C_6H_4(OCH_3)$ | 0.1 / 0.01 / 0.001 | 100 / 100 / 70 |
| (39) | $(C_2H_5O)_2\overset{O}{\underset{\parallel}{P}}-O-C(CN)=CH-C_6H_4(OCH_3)$ (para) | 0.1 / 0.01 | 100 / 100 |
| (40) | $(C_2H_5O)_2\overset{S}{\underset{\parallel}{P}}-O-C(CN)=CH-C_6H_3(Cl)(SC_2H_5)$ | 0.1 / 0.01 | 100 / 90 |

EXAMPLE 3

Tetranychus test

Solvent: 3 parts by weight acetone.
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 3.

TABLE 3
Tetranychus test

| Active compound | Concentration of active compound in percent | Degree of destruction in percent after 2 days |
|---|---|---|
| (C) (known) $(C_2H_5O)_2\overset{S}{\underset{\parallel}{P}}-O-\underset{\underset{CH_3}{\vert}}{C}=\underset{\underset{C_6H_5}{\vert}}{CH}$ with CN | 0.1 | 0 |
| (B) (known) $(C_2H_5O)_2\overset{O}{\underset{\parallel}{P}}-O-C=CH$ with 2,4-Cl, Cl | 0.1 / 0.01 | 100 / 0 |
| (A) (known) $(CH_3O)_2\overset{O}{\underset{\parallel}{P}}-O-C=CH$ with 2,4,5-Cl / Cl | 0.1 | 0 |
| (11) $C_2H_5O, C_2H_5$ - $\overset{S}{\underset{\parallel}{P}}-O-C=CH$, CN, Cl-phenyl | 0.1 / 0.01 | 100 / 98 |
| (13) $(C_2H_5O)_2\overset{S}{\underset{\parallel}{P}}-O-C=CH$, CN, Cl-phenyl | 0.1 / 0.01 | 100 / 60 |
| (19) $C_2H_5O, C_2H_5$ - $\overset{S}{\underset{\parallel}{P}}-O-C=CH$, CN, Cl,Cl-phenyl | 0.1 / 0.01 | 100 / 70 |
| (22) $(C_2H_5O)_2\overset{S}{\underset{\parallel}{P}}-O-C=CH$, CN, Br-phenyl | 0.1 / 0.01 | 100 / 90 |
| (23) $C_2H_5O, C_2H_5$ - $\overset{S}{\underset{\parallel}{P}}-O-C=CH$, CN, Br-phenyl | 0.1 / 0.01 | 100 / 100 |
| (25) $C_2H_5O, CH_3$ - $\overset{S}{\underset{\parallel}{P}}-O-C=CH$, CN, phenyl | 0.1 / 0.01 | 100 / 60 |
| (27) $(C_2H_5O)_2\overset{S}{\underset{\parallel}{P}}-O-C=CH$, CN, CH_3-phenyl | 0.1 / 0.01 | 100 / 40 |

EXAMPLE 4

Myzus test (contact action)/resistant strains

Solvent: 3 parts by weight acetone.
Emulsifier: 1 part by weight alkylaryl polyglycol ether.

To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the asphids are killed.

The active compounds, the concentrations of the active compounds, the evaluation times and the results can be seen from the following Table 4.

TABLE 4
*Myzus persicae*/resistant

| Active compound | Concentration of active compound in percent | Degree of destruction in percent after 1 day |
|---|---|---|
| (C) (known) $C_2H_5O, C_2H_5O$ - $\overset{S}{\underset{\parallel}{P}}-O-C=C$, CH_3, CN, phenyl | 0.1 / 0.02 / 0.004 | 65 / 40 / 25 |
| (B) (known) $C_2H_5O, C_2H_5O$ - $\overset{O}{\underset{\parallel}{P}}-O-C=CH$, Cl, 2,4-Cl-phenyl | 0.1 / 0.02 / 0.004 / 0.0008 | 100 / 100 / 75 / 20 |

TABLE 4—Continued

| Active compound | Concentration of active compound in percent | Degree of destruction in percent after 1 day |
|---|---|---|
| (A) [structure: $(CH_3O)_2P(O)-O-C(=CH\text{-Cl})-$ 2,4,5-trichlorophenyl] (known) | 0.1 | 15 |
| (6) [structure: $(C_2H_5O)(C_2H_5)P(S)-O-C(=CH\text{-CN})-$ phenyl] | 0.1<br>0.02<br>0.004<br>0.0008 | 100<br>100<br>100<br>65 |
| (11) [structure: $(C_2H_5O)(C_2H_5)P(S)-O-C(=CH\text{-CN})-$ 2-chlorophenyl] | 0.1<br>0.02<br>0.004<br>0.0008 | 100<br>100<br>100<br>45 |
| (25) [structure: $(C_2H_5O)(C_2H_5)P(S)-O-C(=CH\text{-CN})-$ 2-methylphenyl] | 0.1<br>0.02<br>0.004<br>0.0008 | 100<br>100<br>99<br>15 |
| (28) [structure: $(C_2H_5O)(C_2H_5)P(S)-O-C(=CH\text{-CN})-$ 3-methylphenyl] | 0.1<br>0.02<br>0.004<br>0.0008 | 100<br>100<br>100<br>90 |

EXAMPLE 5

$LT_{100}$ test for Diptera

Test animals: *Aedes aegypti*.
Solvent: Acetone.

2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test animals are then placed in the Petri dish and it is covered with a glass lid.

The condition of the test animals is periodically observed. The time which is necessary for a 100% destruction is determined.

The test animals, the active compounds, the concentrations of the active compounds and the periods of time at which there is a 100% destruction can be seen from the following Table 5.

TABLE 5
$LT_{100}$ test for Diptera

| Active compound | Concentration of the active compound of the solution in percent | $Lt_{100}$ |
|---|---|---|
| (B) [structure: 2,5-dichloro-phenyl $-C(Cl)=CH-O-P(O)(OC_2H_5)_2$] (known) | 0.2<br>0.02 | 120'<br>$3^h = 80\%$ |
| (C) [structure: phenyl $-C(CH_3)=CH(CN)-O-P(S)(OC_2H_5)_2$] (known) | 0.2 | $3^h = 90\%$ |
| (6) [structure: phenyl $-C(=CH\text{-CN})-O-P(S)(OC_2H_5)(C_2H_5)$] | 0.2<br>0.02 | 60'<br>120' |
| (3) [structure: phenyl $-C(=CH\text{-CN})-O-P(S)(OCH_3)_2$] | 0.2<br>0.02<br>0.002 | 60'<br>120'<br>180' |
| (27) [structure: 4-methylphenyl $-C(=CH\text{-CN})-O-P(S)(OC_2H_5)_2$] | 0.2<br>0.02 | 60'<br>120' |
| (25) [structure: 2-methylphenyl $-C(=CH\text{-CN})-O-P(S)(OC_2H_5)(C_2H_5)$] | 0.2<br>0.02 | 60'<br>60' |
| (24) [structure: 2-methylphenyl $-C(=CH\text{-CN})-O-P(S)(OC_2H_5)_2$] | 0.2<br>0.02<br>0.002 | 60'<br>60'<br>$3^h = 90\%$ |
| (16) [structure: 4-chlorophenyl $-C(=CH\text{-CN})-O-P(S)(OC_2H_5)_2$] | 0.2<br>0.02<br>0.002 | 60'<br>60'<br>180' |
| (1) [structure: phenyl $-C(=CH\text{-CN})-O-P(S)(OC_2H_5)_2$] | 0.2<br>0.02<br>0.002 | 60'<br>60'<br>180' |

TABLE 5—Continued

| Active compound | Concentration of the active compound of the solution in percent | $Lt_{100}$ |
|---|---|---|
| (20) Cl-phenyl-Cl, HC=C, NC, O-P(=S)-(OC$_2$H$_5$)$_2$, —Cl | 0.2 / 0.02 / 0.002 | 60' / 120' / 3ʰ=90% |
| (33) CH$_3$O-phenyl, HC=C, NC, O-P(=S)(OC$_2$H$_5$)(C$_2$H$_5$) | 0.2 / 0.02 | 60' / 120' |
| (19) Cl-phenyl-Cl, HC=C, NC, O-P(=S)(OC$_2$H$_5$)(C$_2$H$_5$) | 0.2 / 0.02 | 60' / 120' |
| (23) Br-phenyl, HC=C, NC, O-P(=S)(OC$_2$H$_5$)(C$_2$H$_5$) | 0.2 / 0.02 | 60' / 120' |

EXAMPLE 6

LD$_{100}$ test

Test animals: *Blatta orientalis*.
Solvent: Acetone.

2 parts by weight of the active compound are dissolved in 1000 parts by volume of the solvent. The solution so obtained is diluted with further solvent to the desired concentrations.

2.5 ml. of the solution of the active compound are pipeted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. 10 test animals are then placed in the Petri dish and it is covered with a glass lid.

The condition of the test animals is observed 3 days after the commencement of the experiments. The destruction is determined as a percentage.

The active compounds, the concentrations of the active compounds, the test animals and the results can be seen from the following Table 6.

TABLE 6

LD$_{100}$ test/*Blatta orientalis*

| Active compound | Concentrations of active compound percent strength solution | Destruction in percent |
|---|---|---|
| (B) Cl-phenyl-Cl, HC=C, Cl, O-P(=O)-(OC$_2$H$_5$)$_2$ (known) | 0.2 | 0 |
| (C) phenyl, NC-C=C-CH$_3$, O-P(=S)-(OC$_2$H$_5$)$_2$ (known) | 0.2 | 0 |
| (6) phenyl, HC=C, NC, O-P(=S)(OC$_2$H$_5$)(C$_2$H$_5$) | 0.2 | 100 |
| (3) phenyl, HC=C, NC, O-P(=S)-(OCH$_3$)$_2$ | 0.2 / 0.02 / 0.002 | 100 / 100 / 0 |
| (25) CH$_3$-phenyl, HC=C, NC, O-P(=S)(OC$_2$H$_5$)(C$_2$H$_5$) | 0.2 / 0.02 | 100 / 30 |
| (16) phenyl-Cl, HC=C, NC, O-P(=S)-(OC$_2$H$_5$)$_2$ | 0.2 / 0.02 | 100 / 0 |
| (1) phenyl, HC=C, NC, O-P(=S)-(OC$_2$H$_5$)$_2$ | 0.2 / 0.02 / 0.002 | 100 / 100 / 0 |
| (33) CH$_3$O-phenyl, HC=C, NC, O-P(=S)(OC$_2$H$_5$)(C$_2$H$_5$) | 0.2 / 0.02 | 100 / 0 |
| (21) Cl-phenyl-Cl, HC=C, NC, O-P(=S)(OC$_2$H$_5$)(C$_2$H$_5$) | 0.2 / 0.02 | 100 / 0 |

EXAMPLE 7

LD$_{100}$ test

Test animals: *Sitophils granarius*
Solvent: Acetone.

2 parts by weight of the active compound are dissolved in 1000 parts by volume of the solvent. The solution so obtained is diluted with further solvent to the desired concentrations.

2.5 ml. of the solution of the active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. 25 test animals are then placed in the Petri dish and it is covered with a glass lid.

The condition of the test animals is observed 3 days after the commencement of the experiments. The destruction is determined as a percentage.

The active compounds, the concentrations of the active compounds, the test animals and the results can be seen from the following Table 7.

TABLE 7

| Active compound | Concentrations of active compound, percent strength solution | Destruction in percent |
|---|---|---|
| (C) NC,CH₃ / C=C / phenyl / O—P(OC₂H₅)₂ ‖S  (known) | 0.2 | 0 |
| (6) HC=C(phenyl) / NC / O—P(OC₂H₅)(C₂H₅) ‖S | 0.2 / 0.02 / 0.002 | 100 / 100 / 0 |
| (3) HC=C(phenyl) / NC / O—P(OCH₃)₂ ‖S | 0.2 / 0.02 / 0.002 / 0.0002 | 100 / 100 / 100 / 0 |
| (17) HC=C(phenyl-Cl) / NC / O—P(OC₂H₅)(C₂H₅) ‖S | 0.2 / 0.02 | 100 / 90 |
| (41) HC=C(phenyl-OCH₃) / NC / O—P(OC₂H₅)₂ ‖S | 0.2 / 0.02 / 0.002 | 100 / 100 / 80 |
| (35) HC=C(phenyl-OCH₃) / NC / O—P(CH₃)(OC₂H₅) ‖S | 0.2 / 0.02 | 100 / 60 |
| (42) HC=C(phenyl-OCH₃) / NC / O—P(OC₂H₅)(C₂H₅) ‖S | 0.2 / 0.02 | 100 / 95 |

TABLE 7—Continued

| Active compound | Concentrations of active compound, percent strength solution | Destruction in percent |
|---|---|---|
| (27) HC=C(phenyl-CH₃) / NC / O—P(OC₂H₅)₂ ‖S | 0.2 / 0.02 / 0.002 | 100 / 100 / 0 |
| (43) HC=C(phenyl-CH₃) / NC / O—P(OC₂H₅)₂ ‖O | 0.2 / 0.02 | 100 / 95 |
| (28) HC=C(phenyl-CH₃) / NC / O—P(C₂H₅)(OC₂H₅) ‖S | 0.2 / 0.02 / 0.002 | 100 / 100 / 0 |
| (25) HC=C(phenyl-CH₃, ortho) / NC / O—P(OC₂H₅)(C₂H₅) ‖S | 0.2 / 0.02 / 0.002 | 100 / 100 / 0 |
| (24) HC=C(phenyl-CH₃, ortho) / NC / O—P(OC₂H₅)₂ ‖S | 0.2 / 0.02 / 0.002 | 100 / 100 / 0 |
| (16) HC=C(phenyl-Cl) / NC / O—P(OC₂H₅)₂ ‖S | 0.2 / 0.02 / 0.002 | 100 / 100 / 70 |
| (1) HC=C(phenyl) / NC / O—P(OC₂H₅)₂ ‖S | 0.2 / 0.02 / 0.002 / 0.0002 | 100 / 100 / 100 / 95 |
| (20) HC=C(phenyl-Cl,Cl) / NC / O—P(OC₂H₅)₂ ‖S | 0.2 / 0.02 / 0.002 | 100 / 100 / 0 |

TABLE 7—Continued

| Active compound | Concentrations of active compound, percent strength solution | Destruction in percent |
|---|---|---|
| (30) 4-CH₃-C₆H₄-C(CN)=CH-O-P(S)(OC₂H₅)₂ | 0.2 / 0.02 | 100 / 90 |
| (33) 4-CH₃O-C₆H₄-C(CN)=CH-O-P(S)(OC₂H₅)(C₂H₅) | 0.2 / 0.02 / 0.002 | 100 / 100 / 0 |
| (21) 2,4-Cl₂-C₆H₃-C(CN)=CH-O-P(S)(OC₂H₅)(C₂H₅) | 0.2 / 0.02 | 100 / 90 |
| (19) 2,5-Cl₂-C₆H₃-C(CN)=CH-O-P(S)(OC₂H₅)(C₂H₅) | 0.2 / 0.02 / 0.002 | 100 / 100 / 0 |
| (23) 4-Br-C₆H₄-C(CN)=CH-O-P(S)(OC₂H₅)(C₂H₅) | 0.2 / 0.02 / 0.002 | 100 / 100 / 0 |
| (22) 4-Br-C₆H₄-C(CN)=CH-O-P(S)(OC₂H₅)₂ | 0.2 / 0.02 / 0.002 | 100 / 100 / 0 |

EXAMPLE 8

Mosquito larvae test

Test insects: *Aedes aegypti* (5th larval stage).
Solvent: 99 parts by weight acetone.
Emulsifier: 1 part by weight benzylhydroxydiphenyl polyglycol ether.

To produce a suitable preparation of active compound, 2 parts by weight of the active compound are dissolved in 1000 parts by volume of the solvent containing the amount of emulsifier stated above. The solution thus obtained is diluted with water to the desired lower concentrations.

The aqueous preparations of the active compounds are placed in glass vessels and about 25 mosquito larvae are then placed in each glass vessel.

After 24 hours, the degree of destruction is determined as a percentage. 100% means that all the larvae are killed. 0% means that no larvae at all are killed.

The active compounds, the concentrations of the active compounds, the test insects and the results can be seen from Table 8.

TABLE 8
Mosquito larvae test

| Active compound | Concentration of active compound of the solution in p.p.m. | Degree of destruction in percent |
|---|---|---|
| (B) 2,4-Cl₂-C₆H₃-C(Cl)=CH-O-P(O)(OC₂H₅)₂ (known) | 10 / 1 / 0.1 | 100 / 60 / 0 |
| (C) C₆H₅-C(CN)=C(CH₃)-O-P(S)(OC₂H₅)₂ (known) | 10 | 80 |
| (6) C₆H₅-C(CN)=CH-O-P(S)(OC₂H₅)(C₂H₅) | 0.1 / 0.01 | 100 / 0 |
| (3) C₆H₅-C(CN)=CH-O-P(S)(OCH₃)₂ | 0.1 / 0.01 | 100 / 60 |
| (41) 4-CH₃O-C₆H₄-C(CN)=CH-O-P(S)(OC₂H₅)₂ | 1 / 0.1 | 100 / 40 |
| (16) 4-Cl-C₆H₄-C(CN)=CH-O-P(O)(OC₂H₅)₂ | 0.1 / 0.01 | 100 / 0 |
| (1) C₆H₅-C(CN)=CH-O-P(S)(OC₂H₅)₂ | 0.01 / 0.001 | 100 / 90 |
| (20) 2,4-Cl₂-C₆H₃-C(CN)=CH-O-P(S)(OC₂H₅)₂ | 0.1 / 0.01 | 100 / 90 |
| (33) 4-CH₃O-C₆H₄-C(CN)=CH-O-P(S)(OC₂H₅)(C₂H₅) | 0.1 / 0.01 | 100 / 0 |

TABLE 8—Continued

| Active compound | Concentration of active compound of the solution in p.p.m. | Degree of destruction in percent |
|---|---|---|
| (21) [structure: Cl-phenyl-Cl with HC=C-NC-O-P(=S)(OC₂H₅)(C₂H₅)] | 0.1 / 0.01 | 100 / 0 |
| (19) [structure: Cl-phenyl-Cl with HC=C-NC-O-P(=S)(OC₂H₅)(C₂H₅)] | 0.1 / 0.01 | 100 / 0 |
| (5) [structure: phenyl with HC=C-NC-O-P(=S)(phenyl)(OC₂H₅)] | 0.1 / 0.01 | 100 / 0 |
| (27) [structure: phenyl-CH₃ with HC=C-NC-O-P(=S)(OC₂H₅)₂] | 0.1 / 0.01 | 100 / 40 |
| (28) [structure: phenyl-CH₃ with HC=C-NC-O-P(=S)(C₂H₅)(OC₂H₅)] | 0.1 / 0.01 | 100 / 0 |
| (25) [structure: CH₃-phenyl with HC=C-NC-O-P(=S)(OC₂H₅)(C₂H₅)] | 0.1 / 0.01 | 100 / 70 |
| (28) [structure: phenyl-CH₃ with HC=C-NC-O-P(=S)(C₂H₅)(OC₂H₅)] | 0.1 / 0.01 | 100 / 0 |
| (24) [structure: CH₃-phenyl with HC=C-NC-O-P(=S)(OC₂H₅)₂] | 0.1 / 0.01 | 100 / 70 |
| (23) [structure: Br-phenyl with HC=C-NC-O-P(=S)(OC₂H₅)(C₂H₅)] | 0.1 / 0.01 | 100 / 50 |
| (22) [structure: Br-phenyl with HC=C-NC-O-P(=S)(OC₂H₅)₂] | 1 / 0.1 | 100 / 90 |

EXAMPLE 9

Test with parasitizing fly larvae

Solvent: 35 parts by weight ethyleneglycolmonomethyl ether.

Emulsifier: 33 parts by weight nonylphenolpolyglycol ether.

To produce a suitable preparation of active compound, 30 parts by weight of the active substance concerned is mixed with the stated amount of solvent which contains the above mentioned proportion of emulsifier, and the concentrate so obtained is diluted with water to the desired concentration.

About 20 fly larvae (*Lucilia cuprina*) are put into a test-tube which contains about 1 cc. of horse musculature. 0.5 ml. of the preparation of active compound are applied to this horseflesh. After 24 hours, the degree of destruction is determined as a percentage. 100% means that all, 0% that no, larvae have been killed.

The active compound tested, the concentration applied and the test results obtained can be seen from Table 9.

TABLE 9
Test with parasitizing fly larvae

| Active compound | Concentration of active compound in p.p.m. | Degree of destruction in percent after 1 day |
|---|---|---|
| (1) [structure: phenyl with NC—CH=C—O—P(=S)(OC₂H₅)₂] | 300 / 30 / 3 | 100 / 100 / <50 |
| (16) [structure: Cl-phenyl with NC—CH=C—O—P(=S)(OC₂H₅)₂] | 300 / 30 / 3 | 100 / 100 / 0 |
| (6) [structure: phenyl with NC—CH=C—O—P(=S)(OC₂H₅)(C₂H₅)] | 300 / 30 / 3 | 100 / 100 / 0 |
| (3) [structure: phenyl with NC—CH=C—O—P(=S)(OCH₃)₂] | 300 / 30 / 3 | 100 / 100 / 100 |
| (41) [structure: OCH₃-phenyl with NC—CH=C—O—P(=S)(OC₂H₅)₂] | 300 / 30 / 3 | 100 / 100 / 100 |
| (42) [structure: OCH₃-phenyl with NC—CH=C—O—P(=S)(OC₂H₅)(C₂H₅)] | 300 / 30 / 3 | 100 / 100 / 0 |

TABLE 9—Continued

| Active compound | Concentration of active compound in p.p.m. | Degree of destruction in percent after 1 day |
|---|---|---|
| (43) 4-OCH₃-C₆H₄-C(=CH-CN)-O-P(=S)(OC₂H₅)(C₆H₅) | 300 / 30 / 3 | 100 / <50 / 0 |
| (35) 4-OCH₃-C₆H₄-C(=CH-CN)-O-P(=S)(CH₃)(OC₂H₅) | 300 / 30 / 3 | 100 / <50 / 0 |
| (5) C₆H₅-C(=CH-CN)-O-P(=S)(OC₂H₅)₂ | 300 / 100 / 30 / 10 | 100 / 100 / 100 / 0 |
| (44) 3-OCH₃-C₆H₄-C(=CH-CN)-O-P(=O)(OC₂H₅)₂ | 300 / 30 / 3 | 100 / <50 / 0 |
| (45) 3-OCH₃-C₆H₄-C(=CH-CN)-O-P(=S)(OC₃H₇n)₂ | 300 / 100 / 30 / 10 | 100 / 100 / 100 / 0 |
| (27) 3-CH₃-C₆H₄-C(=CH-CN)-O-P(=S)(OC₂H₅)₂ | 300 / 30 / 3 | 100 / 100 / 100 |
| (28) 3-CH₃-C₆H₄-C(=CH-CN)-O-P(=S)(C₂H₅)(OC₂H₅) | 300 / 30 / 3 | 100 / 100 / 100 |
| (25) 2-CH₃-C₆H₄-C(=CH-CN)-O-P(=S)(C₂H₅)(OC₂H₅) | 300 / 30 / 3 | 100 / >50 / 0 |
| (24) 2-CH₃-C₆H₄-C(=CH-CN)-O-P(=S)(OC₂H₅)₂ | 300 / 30 / 3 | 100 / 100 / 100 |
| (38) 2-OCH₃-C₆H₄-C(=CH-CN)-O-P(=S)(OC₂H₅)(C₂H₅) | 300 / 30 / 3 | 100 / 100 / 0 |
| (30) 4-CH₃-C₆H₄-C(=CH-CN)-O-P(=S)(OC₂H₅)₂ | 300 / 30 / 3 | 100 / 100 / >50 |
| (29) 4-CH₃-C₆H₄-C(=CH-CN)-O-P(=O)(OC₂H₅)₂ | 300 / 30 / 3 | 100 / 100 / 0 |
| (37) C₆H₅-C(=CH-CN)-O-P(=S)(OCH(CH₃)₂)₂ | 300 / 100 / 30 / 10 / 3 | 100 / 100 / 100 / 100 / 0 |

The following further examples are set forth to illustrate, without limitation, the process for producing the active compounds according to the present invention.

EXAMPLE 10

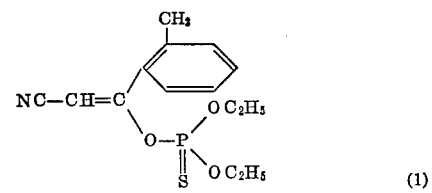

(1)

188.5 g. (1 mole) of thiophosphoric acid O,O-diethyl ester chloride are added dropwise at 20° C. to 167° g. (1 mole) of the sodium salt of ω-cyanoacetophenone in 600 ml. of acetonitrile, the mixture is heated to 40° C. for 4 hours and it is stirred for a further 12 hours at room temperature. The reaction mixture is subsequently poured into 1 liter of ether and the ethereal solution is washed with water and 10%-strength bicarbonate solution. After drying of the organic phase over sodium sulfate, the solvent is drawn off and a yellow oil with the refractive index $n_D^{28} = 1.5411$ is obtained. The yield is 235 g. (79% of the theory).

EXAMPLE 11

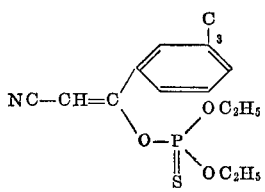

(24)

188.5 g. (1 mole) of thiophosphoric acid O,O-diethyl ester chloride are added dropwise at 20° C. to a mixture of 159 g. (1 mole) of ω-cyano-2-methylacetophenone, 144 g. (1.05 moles) of anhydrous potassium carbonate and 1 liter of acetonitrile, and the mixture is heated to 60° C. for 5 hours. After cooling, the reaction mixture is filtered and the filtrate is taken up with 1.5 liters of ether. The ethereal solution is washed with water; after drying over sodium sulfate it is evaporated and the viscous residue is distilled. An oil with the boiling point 138° C./0.01 mm. Hg and refractive index $n_D^{25}=1.5388$ is obtained. The yield is 153 g. (49% of the theory).

EXAMPLE 12

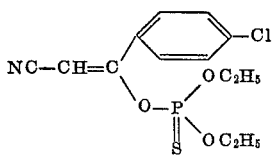

(16)

184.5 g. (1 mole) of 4-chlorobenzoic acid ethyl ester and 54 g. (1 mole) of sodium methylate are stirred together at 50° C. to give a homogeneous mass. Then 51.2 g. (1.25 moles) of acetonitrile are introduced at 80° C. under the surface of the reaction mixture, and the bath temperature is increased to 120 to 140° C. After 12 hours, the alcohol formed during the reaction is distilled off and the solid residue is then suspended in 800 ml. of acetonitrile by very vigorous stirring. 188.5 g. of thiophosphoric O,O-diethyl ester chloride (1 mole) are then added dropwise to the mixture and it is heated to 50° C. for a further 8 hours. The reaction mixture is then poured into 2 liters of water, extracted with methylene chloride, the organic extract is washed with 10%-strength solution of sodium bicarbonate and then dreid over sodium sulfate. After the solvent has been drawn off, the viscous residue is distilled. A red oil with the boiling point 174° C./0.1 mm. Hg and refractive index $n_D^{21}=1.5665$ is obtained. The yield is 40% of the theory.

In manner analogous with that described in Examples 10 to 12, the following compounds can be synthesized:

| | Constitution | Refractive index or boiling point or melting point |
|---|---|---|
| (3) | NC—CH=C—C₆H₅, O—P(=S)(OCH₃)(OCH₃) | $n_D^{28}=1.5655$. |
| (36) | NC—CH=C—C₆H₅, O—P(=S)(OC₃H₇n)(OC₃H₇n) | $n_D^{25}=1.5262$. |
| (37) | NC—CH=C—C₆H₅, O—P(=S)(OC₃H₇i)(OC₃H₇i) | $n_D^{21}=1.5301$. |
| (7) | NC—CH=C—C₆H₅, O—P(=S)(OCH₃)(C₂H₅) | $n_D^{25}=1.5684$. B.P. 137 to 138° C./0.01 mm. Hg. |
| (6) | NC—CH=C—C₆H₅, O—P(=S)(OC₂H₅)(C₂H₅) | $n_D^{28}=1.5600$. |
| (5) | NC—CH=C—C₆H₅, O—P(=S)(OC₂H₅)(C₆H₅) | $n_D^{22}=1.6008$. |
| (8) | NC—CH=C—C₆H₅, O—P(=S)(OC₂H₅)(NHCH₃) | $n_D^{25}=1.5509$. |
| (25) | NC—CH=C—(4-CH₃-C₆H₄), O—P(=S)(OC₂H₅)(C₂H₅) | $n_D^{25}=1.5455$. |
| (27) | NC—CH=C—(4-CH₃-C₆H₄), O—P(=S)(OC₂H₅)(OC₂H₅) | $n_D^{23}=1.5274$. B.P. 160° C./0.05 mm. Hg. |
| (28) | NC—CH=C—(4-CH₃-C₆H₄), O—P(=S)(OC₂H₅)(C₂H₅) | $n_D^{25}=1.5389$. B.P. 155° C./01 mm. Hg. |
| (26) | NC—CH=C—(4-CH₃-C₆H₄), O—P(=O)(OC₂H₅)(OC₂H₅) | $n_D^{25}=1.4981$. B.P. 164° C./0.01 mm. Hg. |
| (30) | NC—CH=C—(4-CH₃-C₆H₄), O—P(=S)(OC₂H₅)(OC₂H₅) | $n_D^{23}=1.5464$. |
| (31) | NC—CH=C—(4-CH₃-C₆H₄), O—P(=S)(OC₂H₅)(C₂H₅) | $n_D^{23}=1.5545$. B.P. 150 to 160° C./0.01 mm. Hg. |
| (29) | NC—CH=C—(4-CH₃-C₆H₄), O—P(=O)(OC₂H₅)(OC₂H₅) | $n_D^{23}=1.5270$. |
| (17) | NC—CH=C—(4-Cl-C₆H₄), O—P(=S)(OC₂H₅)(C₂H₅) | $n_D^{21}=1.5755$. B.P. 150 to 152° C./0.01 mm. Hg. |
| (15) | NC—CH=C—(4-Cl-C₆H₄), O—P(=O)(OC₂H₅)(OC₂H₅) | $n_D^{22}=1.5387$. B.P. 162 to 170° C./0.04 mm. Hg. |

TABLE—Continued

| | Constitution | Refractive index or boiling point or melting point |
|---|---|---|
| (13) | NC—CH=C(—C₆H₄—Cl)(—O—P(=S)(OC₂H₅)(OC₂H₅)) | $n_D^{25}=1.5529$. B.P. 155 to 160° C./0.01 mm. Hg. |
| (14) | NC—CH=C(—C₆H₄—Cl)(—O—P(=S)(OC₂H₅)(C₂H₅)) | $n_D^{20}=1.5577$. B.P. 165° C./0.2 mm. Hg. |
| (12) | NC—CH=C(—C₆H₄—Cl)(—O—P(=O)(OC₂H₅)(OC₂H₅)) | $n_D^{24}=1.5215$. B.P. 165 to 168° C./0.2 mm. Hg. |
| (10) | NC—CH=C(—C₆H₄—Cl)(—O—P(=S)(OC₂H₅)(OC₂H₅)) | $n_D^{26}=1.5430$. B.P. 148° C./0.01 mm. Hg. |
| (11) | NC—CH=C(—C₆H₄—Cl)(—O—P(=S)(OC₂H₅)(C₂H₅)) | $n_D^{26}=1.5529$. B.P. 148° C./0.01 mm. Hg. |
| (9) | NC—CH=C(—C₆H₄—Cl)(—O—P(=O)(OC₂H₅)(OC₂H₅)) | $n_D^{26}=1.5029$. B.P. 160 to 162° C./0.01 mm. Hg. |
| (20) | NC—CH=C(—C₆H₃(Cl)₂)(—O—P(=S)(OC₂H₅)(OC₂H₅)) | $n_D^{25}=1.5442$. |
| (21) | NC—CH=C(—C₆H₃(Cl)₂)(—O—P(=S)(OC₂H₅)(C₂H₅)) | $n_D^{23}=1.5647$. B.P. 175° C./0.01 mm. Hg. |
| (18) | NC—CH=C(—C₆H₃(Cl)₂)(—O—P(=S)(OC₂H₅)(OC₂H₅)) | $n_D^{24}=1.5506$. B.P. 160° C./0.01 mm. Hg. |
| (19) | NC—CH=C(—C₆H₃(Cl)₂)(—O—P(=S)(OC₂H₅)(C₂H₅)) | $n_D^{21}=1.5517$. B.P. 170° C./0.01 mm. Hg. |
| (41) | NC—CH=C(—C₆H₄—OCH₃)(—O—P(=S)(OC₂H₅)(OC₂H₅)) | $n_D^{22}=1.5562$. |
| (46) | NC—CH=C(—C₆H₄—OCH₃)(—O—P(=S)(OC₃H₇n)(OC₃H₇n)) | $n_D^{22}=1.5498$. |
| (35) | NC—CH=C(—C₆H₄—OCH₃)(—O—P(=S)(OC₂H₅)(CH₃)) | M.P. 72° C. |
| (42) | NC—CH=C(—C₆H₄—OCH₃)(—O—P(=S)(OC₂H₅)(C₂H₅)) | $n_D^{22}=1.5810$. |
| (43) | NC—CH=C(—C₆H₄—OCH₃)(—O—P(=S)(C₆H₅)(OC₂H₅)) | $n_D^{22}=1.6142$. |
| (39) | NC—CH=C(—C₆H₄—OCH₃)(—O—P(=O)(OC₂H₅)(OC₂H₅)) | $n_D^{23}=1.5369$. |
| (34) | NC—CH=C(—C₆H₄—OCH₃)(—O—P(=S)(OC₂H₅)(OC₂H₅)) | $n_D^{20}=1.5525$. |
| (47) | NC—CH=C(—C₆H₄—OCH₃)(—O—P(=O)(OC₂H₅)(C₂H₅)) | $n_D^{25}=1.5300$. |
| (38) | NC—CH=C(—C₆H₄—OCH₃)(—O—P(=S)(OC₂H₅)(C₂H₅)) | $n_D^{25}=1.5624$. |
| (32) | NC—CH=C(—C₆H₄—OCH₃)(—O—P(=O)(OC₂H₅)(OC₂H₅)) | $n_D^{23}=1.5410$. |
| (33) | NC—CH=C(—C₆H₄—OCH₃)(—O—P(=S)(OC₂H₅)(C₂H₅)) | $n_D^{22}=1.5397$. B.P. 160 to 165° C./0.01 mm. Hg. |

TABLE—Continued

| Constitution | Refractive index or boiling point or melting point |
|---|---|
| (48) NC—CH=C(—C₆H₄—CH₃)—O—P(=S)(OCH₃)(OCH₃) | M.P. 83 to 85° C. |
| (49) NC—CH=C(—C₆H₄—Cl)—O—P(=S)(OC₂H₅)(C₆H₅) | $n_D^{24}=1.6078$ |
| (50) NC—CH=C(—C₆H₄—CH₃)—O—P(=S)(OC₂H₅)(C₆H₅) | $n_D^{24}=1.5990$ |
| (51) NC—CH=C(—C₆H₄—CH₃)—O—P(=S)(OC₃H₇i)(OC₃H₇i) | $n_D^{24}=1.5282$ |
| (23) NC—CH=C(—C₆H₄(Br))—O—P(=S)(OC₂H₅)(C₂H₅) | $n_D^{24}=1.5571$ |
| (22) NC—CH=C(—C₆H₄(Br))—O—P(=S)(OC₂H₅)(OC₂H₅) | $n_D^{24}=1.5525$ |
| (40) NC—CH=C(—C₆H₃(Cl)(SC₂H₅))—O—P(=S)(OC₂H₅)(OC₂H₅) | $n_D^{21}=1.5952$ |

The benzoylacetonitriles or their alkali metal salts to be used as starting compounds can be obtained according to the following methods:

EXAMPLE 13

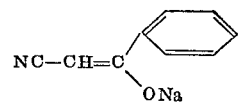
(IVb)

136 g. (1 mole) of benzoic acid methyl ester (or 150 g.=1 mole benzoic acid ethyl ester) and 54 g. (1 mole) of sodium methylate are heated to 80° C. on an oil bath and stirred together to give a gelatinous mass. 51 g. (1.25 moles) of acetonitrile are introduced under surface of the homogeneous mass, and the bath temperature is increased to 120 to 140° C. After 12 hours the mixture is cooled to —10° C. and the precipitated sodium salt is filtered off with suction. After repeated digestion with ether, drying is effected in a desiccator. The yield is 100 g. (60% of the theory).

EXAMPLE 14

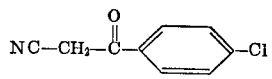
(IVc)

369 g. (2 moles) of 4-chlorobenzoic acid ethyl ester and 108 g. (2 moles) of sodium methylate are stirred together at 50° C. to give a homogeneous mass. Then 102.5 g. (2.5 moles) of acetonitrile are at 80° C. introduced below the surface of the reaction mixture, and the bath temperature is increased to 120 to 140° C. After 12 hours, the reaction mixture is poured into ice water. It is extracted once with ether in order to remove neutral impurities and then acidified with concentrated hydrochloric acid. The precipitate forming is taken up in ether.

After the ether has been drawn off, there remains a solid residue which is recrystallized from ethanol. Colorless crystals of the melting point 129° C. are obtained. The yield is 245 g. (68% of the theory).

In this manner, the following exemplary benzoylacetonitriles or their sodium salts are obtainable:

| Product (constitution) | | Yield, percent of the theory | M.P., ° C. | Analogously with method |
|---|---|---|---|---|
| (IVb) | NC—CH=C(—C₆H₅)(ONa) | 60 | | 1 |
| (IVa) | NC—CH₂—C(=O)—C₆H₅ | 55 | 82 | 2 |
| (IVd) | NC—CH=C(—C₆H₄—Cl)(ONa) | 94 | | 1 |
| (IVc) | NC—CH₂—C(=O)—C₆H₄—Cl | 68 | 129 | 2 |
| (IVe) | NC—CH=C(—C₆H₄(Cl))(ONa) | 79 | | 1 |

TABLE—Continued

| | Product (constitution) | Yield, percent of the theory | M.P., °C. | Analogously with method |
|---|---|---|---|---|
| (IVf) | NC—CH=C(—ONa)(—C6H4-2-Cl) | 88 | | 1 |
| (IVg) | NC—CH=C(ONa)(—C6H4-4-CH3) | 67 | | 1 |
| (IVh) | NC—CH2—C(=O)(—C6H4-4-CH3) | 33 | 100 | 2 |
| (IVj) | NC—CH=C(ONa)(—C6H4-3-CH3) | 37 | | 1 |
| (IVk) | NC—CH2—C(=O)(—C6H4-2-CH3) | 37 | 84–85 | 2 |
| (IVl) | NC—CH=C(ONa)(—C6H4-4-OCH3) | 77 | | 1 |
| (IVm) | NC—CH=C(ONa)(—C6H4-3-OCH3) | 88 | | 1 |
| (IVn) | NC—CH2—C(=O)(—C6H4-3-OCH3) | 71 | 85 | 2 |
| (IVo) | NC—CH2—C(=O)(—C6H4-2-OCH3) | 50 | 67 | 2 |
| (IVp) | NC—CH=C—ONa (—C6H3-2,4-Cl2) | 10 | | 1 |
| (IVq) | NC—CH=C—ONa (—C6H3-2,5-Cl2) | 48 | | 1 |
| (IVr) | NC—CH=C(ONa)(—C6H3-2-Cl-4-SC2H5) | 15 | | 1 |

It will be appreciated that the instant specification and examples are set forth by way of illustration and not limitation, and that various modifications and changes may be made without departing from the spirit and scope of the present invention.

What is claimed is:

1. 1 - phenyl - 2 - cyanovinyl - (thio) - phosphoric or -phosphonic acid derivatives of the general formula:

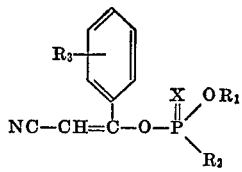

(I)

in which
X is oxygen or sulfur,
$R_1$ is lower alkyl,
$R_2$ is lower alkyl or alkoxy, phenyl or lower monoalkylamino, and
$R_3$ is hydrogen, halogen, lower alkyl, lower alkoxy or lower alkylmercapto.

2. Compounds according to claim 1 in which $R_1$ is alkyl with 1 to 3 carbon atoms, $R_2$ is alkyl or alkoxy with 1 to 3 carbon atoms, or phenyl, or monoalkylamino with 1 to 3 carbon atoms, and $R_3$ is hydrogen, chlorine, bromine, or alkyl, alkoxy or alkylmercapto with 1 to 4 carbon atoms.

3. A compound according to claim 1 wherein such compound is O,O-diethyl-O-1-phenyl-2-cyanovinyl-thiophosphoric acid ester of the formula

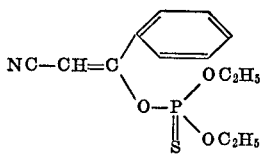

(1)

4. A compound according to claim 1 wherein such compound is O,O - diethyl - O - 1 - (4' - chlorophenyl)-2-cyanovinylthiophosphoric acid ester of the formula

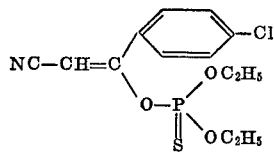

(16)

5. A compound according to claim 1 wherein such compound is O,O-diisopropyl-O-1-phenyl-2-cyanovinyl-thiophosphoric acid ester of the formula

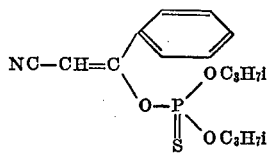

(37)

6. A compound according to claim 1 wherein such compound is O,O - diethyl - O - 1-(2',4'-dichlorophenyl)-2-cyanovinylthiophosphoric acid ester of the formula

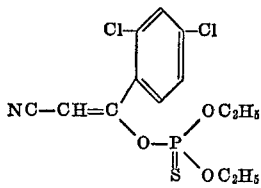

(18)

7. A compound according to claim 1 wherein such compound is O-ethyl-O-1-(2,4-dichlorophenyl)-2-cyanovinylethanethiophosphonic acid ester of the formula

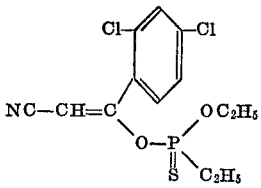

(19)

8. A compound according to claim 1 wherein such compound is O - ethyl - O - 1 - (2' - bromophenyl) - 2-cyanovinylethanethiophosphonic acid ester of the formula

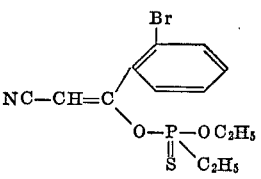

(23)

9. A compound according to claim 1 wherein such compound is O,O - diethyl - O - 1 - (2'-bromophenyl)-2-cyanovinyl-thiophosphoric acid ester of the formula

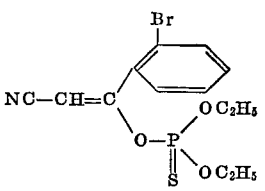

(22)

No references cited.

LEWIS GOTTS, Primary Examiner

A. H. SUTTO, Assistant Examiner

U.S. Cl. X.R.

260—465 R, 465 F, 972; 424—210

UNITED STATES PATENT OFFICE
CERTIFICATE OF CORRECTION

Patent No. 3,763,285  Dated October 2, 1973

Inventor(s) Hans-Jochem Riebel et al  Page 1 of 3

It is certified that error appears in the above-identified patent and that said Letters Patent are hereby corrected as shown below:

Col. 2, line 16, Compound (III), change "C=N" to -- C=C --.

Col. 4, lines 5 and 6, cancel "or pyridine, amine" and substitute therefor --dimethylamine--.

Col. 11, Table 1, Compound (23), cancel " -Cl".

Col. 12, Compound (26), last column, under " 100
                                              100"

insert -- 70 --.

Col. 13, line 30, correct spelling of "cochleariae".

Col. 13, Table 2, Compound (6), last column, change "69" to --60--

Col. 22, Example 7, line 69, correct spelling of "Sitophilus".

Col. 23, Table 7, insert under "TABLE 7"

--($LD_{100}$ test/Sitophilus granarius) --.

Col. 25, Table 7, Compound (33), second column in Table, change

"0." to -- 0.2 --;

UNITED STATES PATENT OFFICE
CERTIFICATE OF CORRECTION

Patent No. 3,763,285                    Dated October 2, 1973

Inventor(s)  Hans-Jochem Riebel et al.

It is certified that error appears in the above-identified patent and that said Letters Patent are hereby corrected as shown below:

Col. 25, Table 7, Compound (21), correct formula to read as follows:

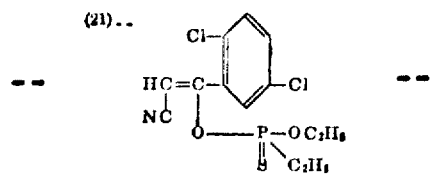

Col. 29, Table 9, Compound (25), correct formula to read as follows:

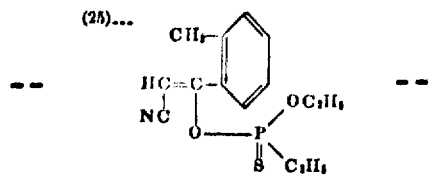

Col. 30, Example 10, in the formula, delete "$\underset{|}{C}H_2$"

Col. 30, line 65, cancel " ° " after "167".

Col. 31, Example 11, in the formula, change "$\underset{|}{C}_3$" to --$\underset{|}{C}H_3$--.

Col. 31, Example 12, in the Table, heading of last column, cancel "or melting point".

UNITED STATES PATENT OFFICE
CERTIFICATE OF CORRECTION

Patent No. 3,763,285  Dated October 2, 1973

Inventor(s) Hans-Jochem Riebel et al.   Page 3 of 3

It is certified that error appears in the above-identified patent and that said Letters Patent are hereby corrected as shown below:

Col. 35, in the Table, Compound (40), change "$OC_2H$" to -- $OC_2H_5$ --.

Col. 37, Example 14, in the Table, Compound (IVh) change $$\overset{\text{"}}{\underset{\overset{\text{"}}{O}}{O}} \text{ to } -- \overset{\text{"}}{\underset{\overset{\text{"}}{C}}{O}} --.$$

Signed and sealed this 15th day of October 1974.

(SEAL)
Attest:

McCOY M. GIBSON JR.          C. MARSHALL DANN
Attesting Officer            Commissioner of Patents